United States Patent
Hamad et al.

(10) Patent No.: US 9,539,541 B2
(45) Date of Patent: Jan. 10, 2017

(54) MIXED SALT $CO_2$ SORBENT, PROCESS FOR MAKING AND USES THEREOF

(71) Applicants: SAUDI ARABIAN OIL COMPANY, Dhahran (SA); RESEARCH TRIANGLE INSTITUTE, Research Triangle Park, NC (US)

(72) Inventors: Esam Zaki Hamad, Dhahran (SA); Wajdi Issam Al-Sadat, Dhahran (SA); Luke Coleman, Durham, NC (US); J. P. Shen, Research Triangle Park, NC (US); Raghubir Gupta, Durham, NC (US)

(73) Assignees: SAUDI ARABIAN OIL COMPANY, Dhahran (SA); RESEARCH TRIANGLE INSTITUTE, Research Triangle Park, NC (US)

( * ) Notice: Subject to any disclaimer, the term of this patent is extended or adjusted under 35 U.S.C. 154(b) by 0 days.

(21) Appl. No.: 13/744,992

(22) Filed: Jan. 18, 2013

(65) Prior Publication Data
US 2013/0195742 A1   Aug. 1, 2013

Related U.S. Application Data

(60) Provisional application No. 61/588,927, filed on Jan. 20, 2012, provisional application No. 61/673,395, filed on Jul. 19, 2012.

(51) Int. Cl.
  *B01D 53/04* (2006.01)
  *B01D 53/94* (2006.01)
  (Continued)

(52) U.S. Cl.
  CPC ............... *B01D 53/94* (2013.01); *B01D 53/02* (2013.01); *B01D 53/92* (2013.01); *B01J 20/04* (2013.01);
  (Continued)

(58) Field of Classification Search
  None
  See application file for complete search history.

(56) References Cited

U.S. PATENT DOCUMENTS

| 3,489,693 A | 1/1970 | Wyman |
| 4,433,981 A * | 2/1984 | Slaugh et al. ............... 95/139 |

(Continued)

FOREIGN PATENT DOCUMENTS

| EP | 1074297 A2 | 2/2001 |
| WO | 2009137886 A1 | 11/2009 |

OTHER PUBLICATIONS

International Search Report for PCT/US2013/022151 dated Apr. 3, 2013 (3 pages).

*Primary Examiner* — Jennifer A Smith
*Assistant Examiner* — Anita Nassiri Motlagh
(74) *Attorney, Agent, or Firm* — Abelman, Frayne & Schwab (57) ABSTRACT

The invention relates to a mixed salt composition which is useful as a $CO_2$ sorbent. The mixed salt composition comprises a Mg salt, and at least one Group IA element salt, where the Mg and Group IA element are present at a molar ratio of from 3:1 to 8:1. The resulting composition can adsorb about 20% or more of CO2 in a gas. Via varying the molar ratios of the components, and the Group IA element, one can develop compositions which show optional functionality at different conditions. The composition is especially useful in the adsorptive capture of $CO_2$ on mobile sources, such as transportation vehicles, where it can be recovered during regeneration of the adsorbent composition and the $CO_2$ used as a coolant gas, as a reactant in manufacture of fuel, and so forth.

17 Claims, 7 Drawing Sheets

$CO_2$ loading with respect to the absorption temperature for a Mg-Na mixed salt sorbent prepared by the gelation technique (51) Int. Cl.
  *B01J 20/04* (2006.01)
  *B01D 53/02* (2006.01)
  *B01D 53/92* (2006.01)
  *B01J 20/30* (2006.01)
  *B01J 20/34* (2006.01)
  *B01D 53/82* (2006.01)

(52) U.S. Cl.
  CPC ............. *B01J 20/041* (2013.01); *B01J 20/043* (2013.01); *B01J 20/3085* (2013.01); *B01J 20/3433* (2013.01); *B01J 20/3483* (2013.01); *B01D 53/82* (2013.01); *B01D 2251/30* (2013.01); *B01D 2251/302* (2013.01); *B01D 2251/304* (2013.01); *B01D 2251/306* (2013.01); *B01D 2251/402* (2013.01); *B01D 2251/60* (2013.01); *B01D 2251/602* (2013.01); *B01D 2251/606* (2013.01); *B01D 2253/112* (2013.01); *B01D 2253/1124* (2013.01); *B01D 2257/504* (2013.01); *B01D 2258/012* (2013.01); *B01D 2259/4566* (2013.01); *B01J 2220/42* (2013.01); *Y02C 10/04* (2013.01); *Y02C 10/08* (2013.01)

(56) References Cited

U.S. PATENT DOCUMENTS

| 5,214,019 | A | 5/1993 | Nalette et al. | |
| 5,454,968 | A | 10/1995 | Nalette et al. | |
| 6,280,503 | B1* | 8/2001 | Mayorga et al. | 95/96 |
| 6,387,337 | B1 | 5/2002 | Pennline et al. | |
| 7,314,847 | B1* | 1/2008 | Siriwardane | 502/400 |
| 7,712,304 | B2 | 5/2010 | Mayer et al. | |
| 2004/0144251 | A1* | 7/2004 | Mitsuda | 95/139 |
| 2008/0083215 | A1* | 4/2008 | Yan | 60/311 |
| 2011/0158874 | A1 | 6/2011 | Smedley et al. | |

* cited by examiner

Figure 1

$CO_2$ loading with respect to the absorption temperature for a Mg-Na mixed salt sorbent prepared by the gelation technique

Figure 2

$CO_2$ loading with respect to the absorption temperature for a Mg-Na mixed salt sorbent prepared by the precipitation technique

Figure 3

$CO_2$ loading with respect to the absorption temperature for a Mg-Na mixed salt sorbent prepared by the precipitation technique

MIXED SALT CO₂ SORBENT, PROCESS FOR MAKING AND USES THEREOF

RELATED APPLICATIONS

This application claims priority from U.S. Provisional Application Nos. 61/588,927 filed Jan. 20, 2012 and 61/673,395 filed Jul. 19, 2012, both incorporated by reference in their entireties.

FIELD OF THE INVENTION

This invention relates to materials which are useful in removing $CO_2$ from gas. More particularly, it relates to mixed salt compositions which act as sorbents for the $CO_2$, methods for making these materials and their uses. These adsorbents are useful for removing $CO_2$ from exhaust gas stream in both stationary and mobile applications, such as transportation vehicles, and so forth.

BACKGROUND AND PRIOR ART

Reduction of $CO_2$ emissions is a key goal for all scientific disciplines, acerbated by the growing evidence of, and concern over, climate change induced by $CO_2$. It is estimated that, in the United States, about ⅓ of $CO_2$ emissions are generated by the transportation sector through combustion of fuels.

One approach to mitigating these emissions is to capture as much $CO_2$ as possible from exhaust gases, prior to their release to the atmosphere. Post-combustion, $CO_2$ capture technologies are being developed for application to stationary sources of $CO_2$. These sources include coal, and natural gas fired power plants, as well as processes for production of materials as diverse as cement and steel. This invention as described herein is useful in such applications, but also in mobile source applications.

Primary challenges for developing useful processes for capture of $CO_2$ from stationary sources, include energy demand, and capital expenditures. Developing technologies which address $CO_2$ capture from mobile sources involves these factors, as well as space limitation, the dynamics of operating conditions, parameters such as high temperature and low pressures, and so forth. High temperatures and low pressures are especially important considerations, because these are outside of the operating and optimum ranges of most $CO_2$ capture technologies.

It is a purpose of the invention described herein to provide an effective, low cost $CO_2$ "scrubbing" technology which addresses these issues. How the invention achieves this will be seen in the disclosure which follows.

SUMMARY OF THE INVENTION

The invention relates to a mixed salt, solid sorbent composition which is useful in removing $CO_2$ from gases. The composition may be regenerated easily, and thus is useful in continuous scrubbing processes. Further, it is useful in removal of $CO_2$ from both mobile and stationary applications. An important feature of the invention is that it is useful in the removal of $CO_2$ from gas mixtures at ambient or near ambient pressures, and at temperatures ranging from about 50° C. to about 400° C., with release of the $CO_2$ at temperatures of from about 150° C. to about 500° C.

The mixed salt sorbent compositions of the invention contain alkaline earth and alkali metals, in salt form and at a range of ratios relative to each other. Preferably, the alkaline earth metal is represented by magnesium (Mg), while the alkali metal is one of the "group IA" elements, i.e., Li, Na, K, or Rb.

As used herein, the term "stationary applications" includes coal, oil, and gas-fired power generating plants, steam boilers for commercial and industrial use, heat plants and other such installations that produce $CO_2$ from the combustion of hydrocarbon fuels.

The term "mobile sources" includes internal combustion engines used to power all types of vehicles such as automobiles, trucks, buses, trains, boats, and airplanes that produce an exhaust gas stream containing $CO_2$ from the combustion of hydrocarbon fuels.

DETAILED DESCRIPTION OF THE FIGURES

FIG. 7 compares results using different carbonate salts.

DETAILED DESCRIPTION OF PREFERRED EMBODIMENTS

Example 1

This example details the preparation and use of a $CO_2$ sorbent according to the invention.

An amount (395 g) of magnesium carbonate hydroxide ($MgCO_3.Mg(OH)_2 \cdot xH_2O$) was added to 800 ml of a solution of sodium carbonate (42.18 g) and sodium nitrate (21.63 g) dissolved in deionized water. This produced a mixed salt slurry which was stirred for 30 minutes. The slurry was then covered and allowed to sit for 16 hours at ambient temperature, after which it was dried, at 120° C., for 16 hours, to form a dry cake of $MgO:Na_2CO_3:NaNO_3$. Analysis showed a mass ratio of 75.8:16:8.2 and a molar ratio of Mg:Na of about 4.8. This dry cake was then calcined by heating from 120° C. to 450° C., at a ramp rate of 3° C./minute, followed by 450° C. for 4 hours. The calcined cake was crushed and sieved to collect a 150-425 mesh fraction, which was then tested.

The testing involved loading a packed bed reactor with 6 g of the sorbent described supra, with inert SiC added to occupy any remaining volume. A conventional gas analyzer was used to measure the concentration of $CO_2$ leaving the reactor. The reactor was then activated by heating it to 450° C., at a rate of 10° C./minute, using a flow of $N_2$ and was held at this temperature until the concentration of $CO_2$ in the effluent dropped below 0.1%. When the $CO_2$ concentration dropped below 0.1%, the reactor was cooled to the lowest adsorption temperature tested and then a simulated exhaust gas (13% $CO_2$, 13% $H_2O$, remainder $N_2$), was added to the reactor as a feedstream. The concentration of $CO_2$ in the gas effluent was measured continuously and the adsorption phase was continued, until the concentration of $CO_2$ in the effluent was 90% of the concentration in the feed gas, i.e., the "90% break through." When this point was reached, the feed gas was changed to pure $N_2$, and its temperature was ramped at 5° C./minute to 450° C. The reactor itself was maintained at 500° C. and until the effluent gas had a $CO_2$ concentration below 0.1% vol., or for 2 hours, so as to regenerate the sorbent. The reactor temperature was then decreased to the desired adsorption temperature, and the process was repeated.

Figure 1:
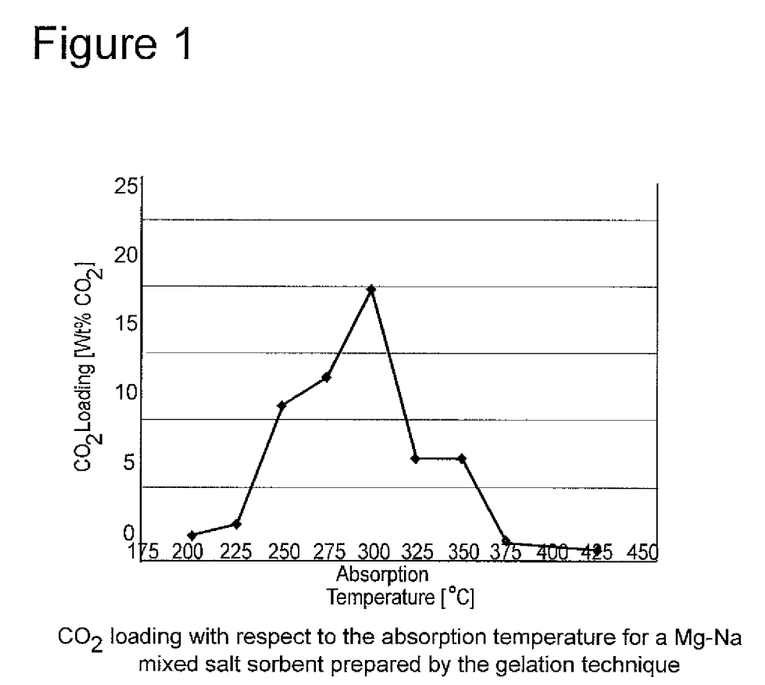
FIG. 1 shows operation of the invention in terms of the amount of $CO_2$ loaded onto the sorbent of the invention over a temperature range of 200-425° C.

FIG. 1 shows the amount of $CO_2$ loaded on the sorbent, over a temperature range of 200-425° C., at 25° C. increments.

Example 2

The prior example described the preparation of the $CO_2$ sorbent via gelation. This example describes a preparation method using precipitation, to form the same mixed salt composition.

Figure 2:
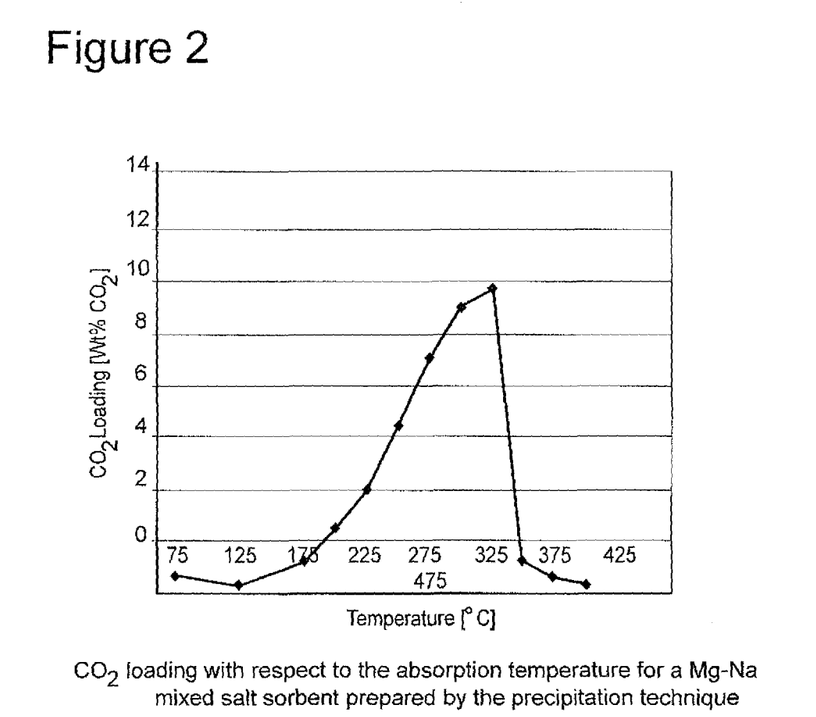
FIG. 2 depicts results obtained under the same conditions for another sorbent in accordance with the invention.

A solution of 233.4 g of $Na_2CO_3$ in 3000 ml deionized water was placed in a 5.0 liter plastic beaker, and stirred vigorously with a mechanical agitator. A second solution, of 188.4 g $Mg(NO_3)_2$: $6H_2O$ in 500 ml of deionized water, was pumped into the first solution, at a rate of approximately 30 ml/minute. A slurry resulted which was stirred for an hour. The slurry was stored, overnight, as described supra, and then filtered to yield a wet precipitate cake. About 3200 mls of filtrate were collected. This was dried, at 120° C. for 24 hours to form a dry cake, which was treated a described in the first example, supra. The sorbent was then tested, as in Example 1. FIG. 2 shows these results.

In additional tests, the effect of the alkali element in the mixed salt sorbent composition was evaluated by using Li, Na, or K salts to prepare the final products. Salts were prepared in the manner set forth, supra, using a molar ratio of Mg:alkali metal of 6:1. The resulting products were tested for their ability to remove $CO_2$ from the simulated exhaust gas described supra. Adsorption was carried out at temperatures ranging from 100-450° C., at GHSV of 3,125/hour. The sorbents were regenerated by ramping temperatures to 450° C., at a rate of 10° C./minute, at a GHSV of 2500/hour.

Figure 3:
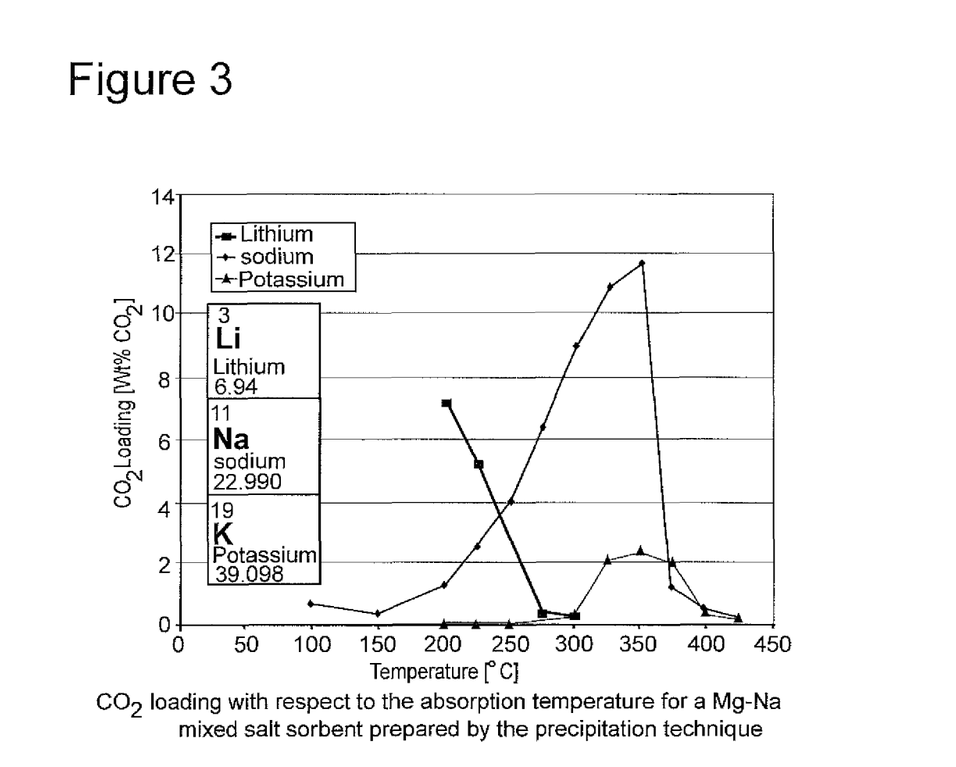
FIG. 3 compares results obtained with different alkali metal salts as part of the sorbent.

FIG. 3 presents these results. While Na presents the best range of operation, the other alkali metals tested function well at different temperatures.

In yet further experiments, the effect of the source of magnesium on the resulting sorbent was tested. The mixed salt compositions of the invention should have either $Mg_2CO_3$ or MgO as a component thereof. Hence, in the reaction producing these sorbents, one selects a Mg compound is selected which will, preferentially, lead to one of these.

$Mg(NO_3)_2$, MgO, and $Mg(OH)_2$ were all tested, using the same parameters of Examples 1 and 2.

Figure 4:
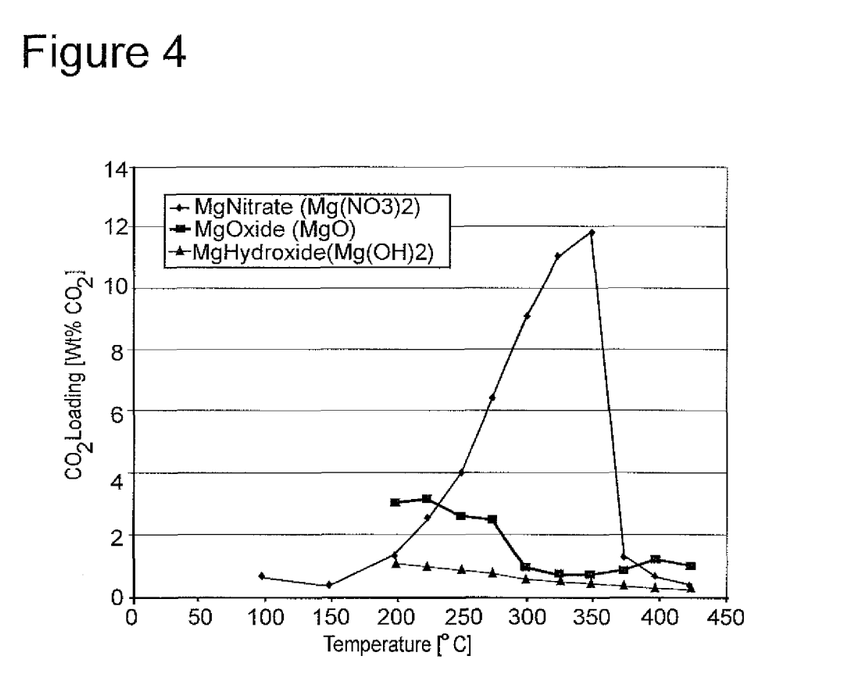
FIG. 4 compares results where different Mg salts were used in the sorbent.

FIG. 4, which presents these results, shows that the nitrate salt produced a sorbent with a significantly greater ability to adsorb $CO_2$.

It is noteworthy that $Mg(NO_3)_2$ has significantly greater solubility in water than the other compounds. The differences in solubility also indicate that the final products result from different reactive mechanisms. The nitrate salt, for example, participates in anion exchange with the sodium salts, whereas the oxide and hydroxide do not. Hence, the more soluble the magnesium salt, the greater the adsorption ability of the final product. $Mg(NO_3)_2$, $MgCl_2$, $Mg(CH_3COO)_2$, and other highly soluble magnesium salts are thus preferred in making the sorbents of the invention.

Further experiments were carried out to understand the role of Na in the adsorbence process. These studies were motivated by the recognition that, when $CO_2$ is adsorbed onto the compositions, it is loaded in the form of $MgCO_3$, while the sodium species do not store the $CO_2$.

Sorbents were prepared, as described, supra, using Mg:Na molar ratios of 3:1 to 8:1, and were tested as described in these examples.

It was found that when the Mg:Na ratio was from 8:1-6:1, the performance followed that of the examples, i.e., $CO_2$ loading capacity increased with adsorption temperature, reaching a maximum of about 13 wt %, at 350° C., followed by a rapid decrease in capacity as temperatures increased.

Figure 5:
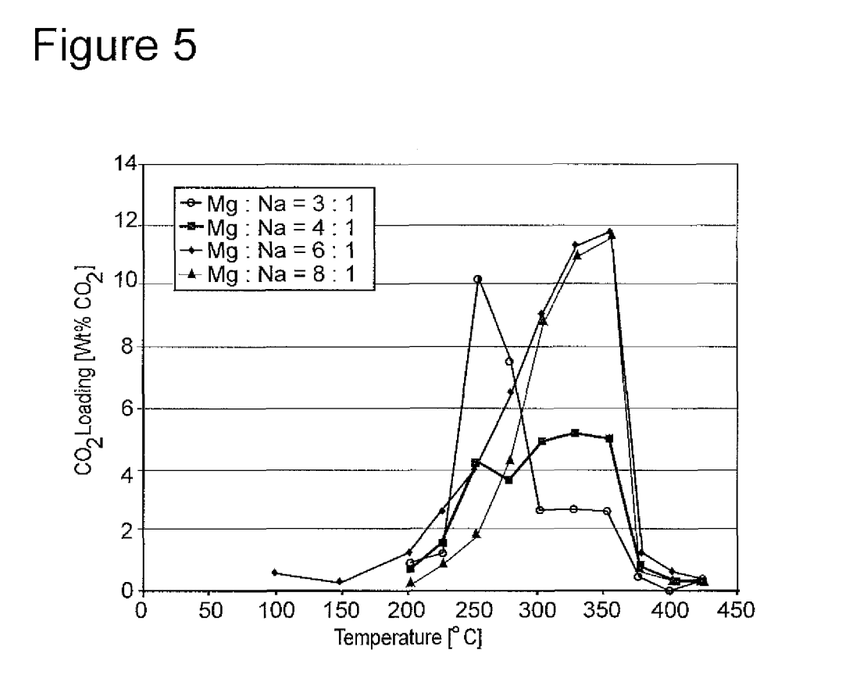
FIG. 5 presents results obtained using sorbents with different Mg:Na ratios.

Decreasing the Mg:Na ratio to 4:1-3:1 impacted loading capacity significantly; however, a decrease in Na content also resulted in a shift to maximum adsorbency at 250° C., as shown in FIG. 5. These findings suggest that different mechanisms are involved.

An additional process parameter which was investigated in the study of the invention was the concentration of the reactants in the precipitating solution.

Comparative tests were undertaken where, as above, the molar ratio of Mg:Na remained 6:1, but where the concentration of the reactants in the solution was 0.05, 0.1, 0.2, and 0.3M. Reactions proceeded as per Example 2, supra, to precipitate mixed salt sorbent materials. The resulting materials were then tested as in Examples 1 and 2.

Figure 6:
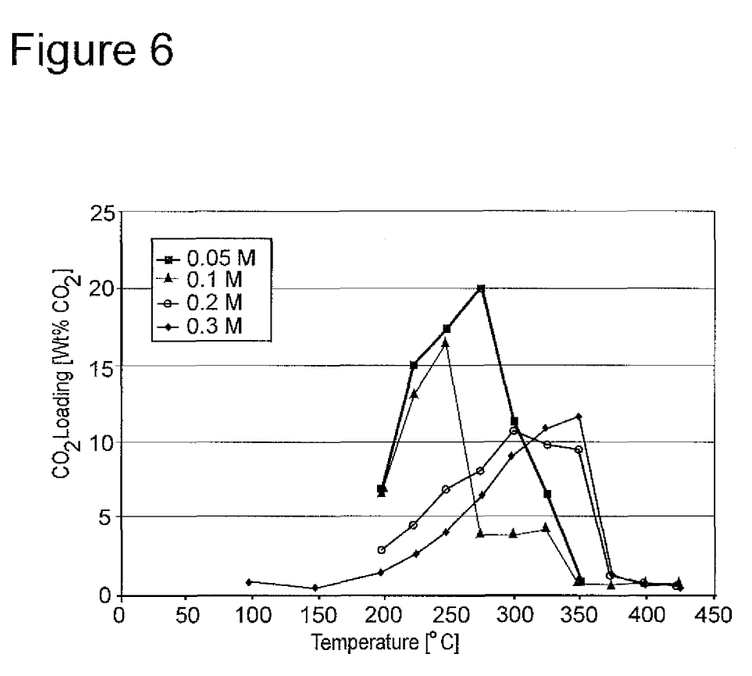
FIG. 6 compares results where reactants used to make the sorbents varied in concentration.

The results, set forth in FIG. 6, shows that concentration had a profound impact on the performance of the sorbents. All functioned, but had optional activity at different temperatures, with a decrease in concentration reducing peak $CO_2$ loading temperature to from 250° C. to 275° C., as well as an increase in $CO_2$ loaded on the sorbent, from about 12-13 wt % to about 20 wt %.

While the experiments, supra, used $Na_2CO_3$ as a precipitating agent, others can be used, as was exemplified with $(NH_4)_2CO_3$.

To prepare the sorbents with $Na_2CO_3$, the precipitating agent was added slowly in the form of a solution, to a solution of $MgNO_3$. For $(NH_4)_2CO_3$, this was added to a solution of $MgNO_3$ and $Na_2NO_3$. The Mg:Na molar ratio of 6:1 was maintained.

Figure 7:
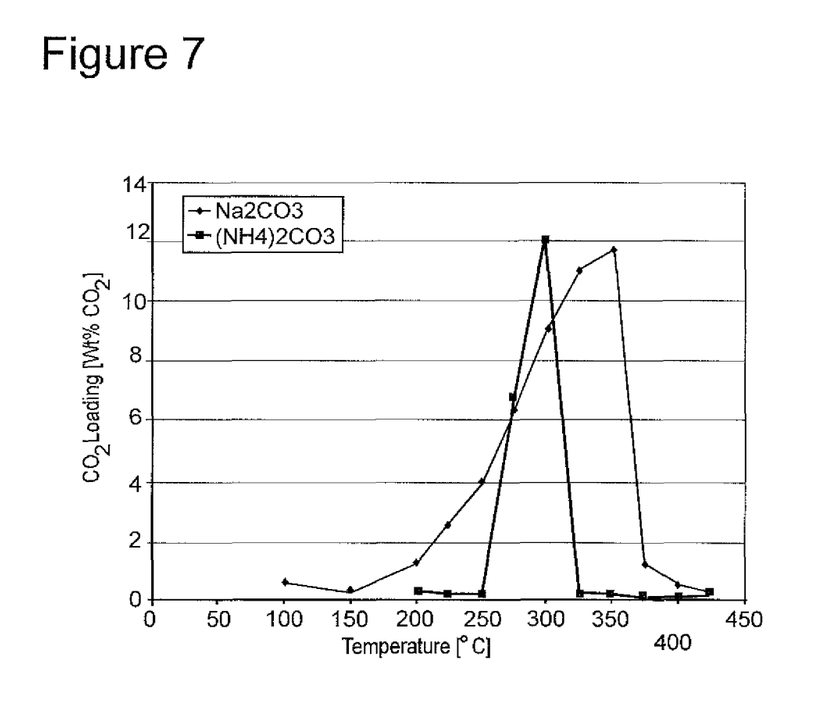

The results, depicted in FIG. 7 showed that the product obtained with $Na_2CO_3$ exhibited a broad range of activity, whereas that prepared with $(NH_4)_2CO_3$ showed a very sharp spike in activity at 300° C., and very little activity at other temperatures. These results suggest that changes in the precipitating agent can be used to prepare sorbents for different applications.

The foregoing disclosure sets forth various features and embodiments of the invention, including a mixed salt composition useful as a sorbent for gaseous $CO_2$. The composition of the invention comprises a mixed salt of a magnesium compound, such as $MgCO_3$ or MgO, and at least one salt of a Group IA metal, wherein the molar ratio of Mg to the Group IA metal may range from 8:1 to 3:1, and is preferably from 6:1 to 4:1. The adsorbents are useful both in stationary and mobile applications for the removal of $CO_2$ from the exhaust gas stream and the recovery of substantially pure $CO_2$ that can be compressed for temporary storage pending its ultimate disposition. Following desorption of the $CO_2$, the regenerated adsorbent can then be revised, without substantial loss in adsorbent capacity during a significant number of cycles.

As noted, the magnesium compound is preferably MgO, and the at least one salt of a Group IA metal is preferably a carbonate, and/or a nitrate salt. An especially preferred composition of the invention is $MgO:Na_2CO_3:NaNO_3$, where the molar ratio of Mg:Na is about 4.8. Salts of Li, K, or Rb may replace the sodium salts in the preferred composition.

The mixed salt sorbents of the invention can be made via, e.g., a gelation reaction, as in Example 1, or preferably a precipitation reaction. To elaborate, a magnesium salt and a Group IA metal salt are prepared in solution form, and combined to form a reactive mixture. This reaction may optionally be carried out with a precipitating agent. The salts are chosen such that, upon reacting with each other, MgO or $MgCO_3$ is formed in the precipitate. Preferably, a highly soluble Mg compound is used, such as MgO itself, $Mg(OH)_2$, or most preferably, $Mg(NO_3)_2$. As noted supra, $MgCl_2$ or $Mg(CH_3COO)_2$ may also be used. Once the Mg salt is chosen, the skilled artisan may determine what Na salt or salts will react therewith to produce the desired MgO/$MgCO_3$.

The examples, supra, describe two methods for making the sorbent, i.e., gelation and co-precipitation, or "precipitation." In the latter method, an Mg salt, and a Group IA metal salt, are dissolved in water, and then a precipitant is added, resulting in precipitation of the sorbent powder. This is the easier method to use in the lab, but it requires large quantities of water, batch yields are low, and material preparation is expensive. The gelation methodology requires greater care, with the "trade off" of less water usage, higher yields, and reduced preparation costs.

Following preparation of the sorbent powder, it can be made into an extrudate, either via adding a binder, such as boehmite, or via special preparative techniques known in the art, which result in a loss in sorbency; however, the technique is useful for keeping pressure drops low, in packed beds, and for rendering handling of the material easier.

In tests summarized here, higher capacity was found in extrudates without binder, and these achieved high $CO_2$ loads (about 20 wt % at 300° C.). The crush strength of such binder-free extrudates without binder was found to be 0.51 MPa, equivalent to those extrudates prepared with boehmite (0.55 MPa).

On an industrial level, extrusion runs are nearly continuous, with continuous extraction and conveyance on, e.g., a belt convection dryer. Again, in experiments only summarized here, different drying rates were tested, and it was found that a rate of about 0.3° C./minute results in an extrudate with reasonable crunch strength. Increasing the drying rates did in fact decrease the strength of the resulting product.

The reaction is carried out with concentrations of the reactive salts which provide for a ratio of Mg:Group IA metal of from 3:1 to 8:1, most preferably from 4:1 to 6:1. The choice of ratios is one left to the artisan because, as noted supra, by varying the ratio one produces sorbents with different properties. Knowing the conditions under which the sorbent will operate will determine the ratios employed. Optionally, a precipitating agent may be added to facilitate the reaction, such as $NaNO_3$. The precipitating agent is preferably a salt of a Group IA metal.

The invention also comprehends methods for removing $CO_2$ from a gas or gas mixture, such as an exhaust gas stream produced by the combustion of a hydrocarbon fuel, by contacting the gas or gas mixture with the mixed salt sorbent described supra, at a temperature which ranges from about 100° C. to about 450° C., preferably from about 250° C. to about 350° C., for a time sufficient for the sorbent to remove a portion of the $CO_2$ therefrom. In practice, the sorbent will become "saturated" by the $CO_2$, and this can be determined by measuring the content of $CO_2$ in gas after it has contacted the sorbent and comparing this value to the amount of $CO_2$ in the gas prior to the contact. When it is evident that $CO_2$ is not being removed to the extent desired, the sorbent can be regenerated by indirect heat exchange, e.g., with the hot exhaust gas stream which is at an elevated temperature, e.g., about 500° C. Again, by measuring the amount of $CO_2$ which is contained in the exiting gas, the ordinary skilled artisan can determine when the sorbent has been regenerated and can be reused.

In practice, the removed $CO_2$ can be compressed and temporarily stored on board the mobile source until it is removed for permanent disposition, such as underground storage. Alternatively, the $CO_2$ can be put to use in various ways. For example, the process described herein, in addition to removing $CO_2$, results in the accumulation of condensed $H_2O$. These two species can be fed into a reactor or other means for generating fuel which, in turn, can be used, e.g., to power the $CO_2$ producing system described herein. Of course, if the fuel is not used as it is produced, it, also can be accumulated and stored for later use.

The stored $CO_2$ can be used, e.g., as a refrigerant gas, and then channeled for cooling and/or air conditioning. The captured $CO_2$ gas released from the adsorbent can be reacted with the condensed water recovered from the exhaust gas stream to form a hydrogen-based fuel which can in turn be used, e.g., to power the ICE of the vehicle in which the $CO_2$ and $H_2O$ were produced. Any solar energy to which the vehicle or other mobile source was exposed can also be stored and used to facilitate this reaction.

In addition, means can be provided in the system for cooling the $CO_2$, thereby permitting its use as a coolant or refrigerant for use in the system.

Other facets of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

What is claimed is:

1. A method for removing $CO_2$ from a gas or gas mixture produced by combustion of hydrocarbon fuel by an internal combustion engine on a mobile source comprising contacting a mixed salt composition which consists of: (i) $MgCO_3$, (ii) at least one carbonate salt of Na, Li, K, or Rb, and (iii) at least one nitrate salt of Na, Li, K, or Rb, wherein the Mg of (i) and the Na, Li, K, or Rb of (ii) and (iii) are present in a molar ratio of from about 6:1 to about 4:1, with said gas or gas mixture produced by said internal combustion engine at a temperature of from about 100° C. to about 450° C. for a time sufficient for said mixed salt composition to remove a portion of $CO_2$ therefrom and releasing adsorbed $CO_2$ to regenerate said composition by heat exchange with hot exhaust gas discharged from said internal combustion engine.

2. A method for removing $CO_2$ from a gas or gas mixture produced by combustion of hydrocarbon fuel by an internal combustion engine on a mobile source comprising contacting a mixed salt composition which consists of: (i) a magnesium salt, (ii) at least one carbonate salt of Na, Li, K, or Rb, and (iii) at least one nitrate salt of Na, Li, K, or Rb, wherein the molar ratio of Mg and said Na, Li, K, or Rb is from about 6:1 to about 4:1, with said gas or gas mixture produced by said internal combustion engine at a temperature of from about 100° C. to about 450° C. for a time sufficient for said mixed salt composition to remove a portion of $CO_2$ therefrom and releasing adsorbed $CO_2$ to regenerate said composition by heat exchange with hot exhaust gas discharged from said internal combustion engine.

3. The method of claim 1, wherein (i) is MgO.

4. The method of claim 1, wherein said mixed salt composition is $MgO:Na_2CO_3:NaNO_3$.

5. The method of claim 1, wherein said temperature is from about 250° C. to about 350° C.

6. The method of claim 1, further comprising contacting said mixed salt composition with an inert gas to remove any $CO_2$ adsorbed therein.

7. The method of claim 6, wherein said inert gas is $N_2$.

8. The method of claim 6, comprising contacting said inert gas to said mixed salt composition at a temperature of about 500° C.

9. The method of claim 1, wherein said mobile source is a transportation vehicle.

10. The method of claim 9, wherein said transportation vehicle is an automobile, truck, bus, train, or boat, and the hydrocarbon fuel is gasoline or diesel fuel.

11. The method of claim 2, wherein (i) is MgO.

12. The method of claim 2, wherein said temperature is from about 250° C. to about 350° C.

13. The method of claim 2, further comprising contacting said mixed salt composition with an inert gas to removed any $CO_2$ adsorbed therein.

14. The method of claim 13, wherein said gas is $N_2$.

15. The method of claim 14, comprising contacting said inert gas to said mixed salt composition at a temperature of about 500° C.

16. The method of claim 2, wherein said mobile source is a transportation vehicle.

17. The method of claim 16, wherein said transportation vehicle is an automobile, truck, bus, train, or boat, and the hydrocarbon fuel is gasoline or diesel fuel.

\* \* \* \* \*